(12) United States Patent
Francis

(10) Patent No.: US 9,674,056 B2
(45) Date of Patent: *Jun. 6, 2017

(54) CALL ROUTING AND REAL-TIME MONITORING

(71) Applicant: 46 Labs Ops, Edmond, OK (US)

(72) Inventor: Trevor Francis, Austin, TX (US)

(73) Assignee: 46 Labs Ops, Edmond, OK (US)

( * ) Notice: Subject to any disclaimer, the term of this patent is extended or adjusted under 35 U.S.C. 154(b) by 323 days.

This patent is subject to a terminal disclaimer.

(21) Appl. No.: 14/333,635

(22) Filed: Jul. 17, 2014

(65) Prior Publication Data

US 2015/0003267 A1    Jan. 1, 2015

Related U.S. Application Data

(63) Continuation of application No. 14/185,569, filed on Feb. 20, 2014, now Pat. No. 8,817,652.

(60) Provisional application No. 61/766,845, filed on Feb. 20, 2013.

(51) Int. Cl.
| | |
|---|---|
| *H04L 12/28* | (2006.01) |
| *H04L 12/26* | (2006.01) |
| *H04M 7/00* | (2006.01) |
| *H04L 29/06* | (2006.01) |
| *H04M 15/00* | (2006.01) |
| *H04J 1/16* | (2006.01) |
| *H04M 3/22* | (2006.01) |
| *H04W 4/24* | (2009.01) |

(52) U.S. Cl.
CPC ........ *H04L 43/045* (2013.01); *H04L 65/1006* (2013.01); *H04M 7/0075* (2013.01); *H04M 15/58* (2013.01); *H04M 3/2218* (2013.01); *H04M 15/8044* (2013.01); *H04W 4/24* (2013.01)

(58) Field of Classification Search
USPC ................................. 370/252, 238, 389, 412
See application file for complete search history.

(56) References Cited

U.S. PATENT DOCUMENTS

| | | | | |
|---|---|---|---|---|
| 8,836,749 | B2 * | 9/2014 | Katz | .................... G06Q 20/208 |
| | | | | 348/14.01 |
| 2002/0118813 | A1 * | 8/2002 | Brehm | .................. H04M 15/00 |
| | | | | 379/229 |
| 2005/0216421 | A1 * | 9/2005 | Barry | .................. G06F 11/0709 |
| | | | | 705/64 |
| 2007/0076857 | A1 | 4/2007 | Chava et al. | |
| 2010/0188975 | A1 * | 7/2010 | Raleigh | ............ G06Q 10/06375 |
| | | | | 370/230.1 |

* cited by examiner

*Primary Examiner* — John Pezzlo
(74) *Attorney, Agent, or Firm* — Lawrence F. Grable, PLLC

(57) ABSTRACT

A method and system for providing call routing analytics. A virtual session initiation protocol switch is provided and hosted in an Internet cloud-based environment. The switch streams live call detail records to a computer system having a processor configured to process all of the subscriber's call records to monitor route performance for the subscriber. Real-time route performance data is transmitted to the subscriber for display at a subscriber computer. The subscriber can then alter a routing of at least a portion of the call utilizing the switch in response to the real-time route performance data to increase quality of signaling and business performance.

21 Claims, 4 Drawing Sheets

| Traffic | Attempts | Completes | Minutes | ASR | ALOC | PDD | Revenue | Cost | Margin | Margin% |
|---|---|---|---|---|---|---|---|---|---|---|
| ▾All Carriers | | | | | | | | | | |
| ▾Originator | 14,156,674 | 3,397,267 | 1,574,726.3 | 24.0% | 0.46 | 1.39 | $6,937.21 | $5,524.05 | $1,413.16 | 20.37% |
| ▾Dialer 1 | 15,686 | 1,057 | 564.1 | 6.74% | 0.53 | 0.52 | $2.91 | $2.46 | $0.45 | 15.63% |
| ▾United States | 15,690 | 1,057 | 564.1 | 6.74% | 0.53 | 0.52 | $2.91 | $2.46 | $0.45 | 15.63% |
| ▾All | 15,691 | 1,057 | 564.1 | 6.74% | 0.53 | 0.52 | $2.91 | $2.46 | $0.45 | 15.63% |
| Carrier 1 | 891 | 60 | 16.9 | 6.73% | 0.28 | 2.39 | $0.11 | $0.09 | $0.01 | 10.09% |
| Carrier 2 | 2,051 | 164 | 54.6 | 8.0% | 0.33 | 0.99 | $0.32 | $0.28 | $0.05 | 14.05% |
| Carrier 3 | 602 | 259 | 39.7 | 43.02% | 0.15 | 1.94 | $0.05 | $0.05 | $0.0 | 5.2% |
| Carrier 4 | 973 | 143 | 66.3 | 14.7% | 0.46 | 2.58 | $0.26 | $0.23 | $0.03 | 12.3% |
| Carrier 5 | 2,602 | 42 | 12.5 | 1.61% | 0.3 | 0.51 | $0.02 | $0.01 | $0.0 | 16.57% |

FIG. 3

| | Daily Minutes 1,574,165.1 | | | Daily Margin $1414.52 | | | | | Daily Margin % $20.39 | | | |
|---|---|---|---|---|---|---|---|---|---|---|---|---|
| Traffic | Attempts | Completes | Minutes | ASR | ALOC | PDD | Revenue | Cost | Margin | Margin % |
| ▾ AllCountries | | | | | | | | | | |
| ▾ Country | 14,185,608 | 3,494,820 | 1,577,705.42 | 24.0% | 0.45 | 0.49 | $6,949.73 | $5,532.92 | $1,417.6 | 20.4% |
| ▸ Albania | 2 | 0 | 0.0 | 0.0% | 0.0 | 0.0 | $0.0 | $0.0 | $0.0 | NaN% |
| ▸ Algeria | 1 | 0 | 0.0 | 0.0% | 0.0 | 0.0 | $0.0 | $0.0 | $0.0 | NaN% |
| ▸ AmericanSamoa | 25 | 1 | 0.1 | 4.0% | 0.1 | 0.04 | $0.1 | $0.09 | $0.0 | 3.65% |
| ▸ Argentina | 1 | 0 | 18.6 | 100.0% | 18.6 | 0.0 | $0.1 | $0.08 | $0.02 | 21.31% |
| ▸ Aruba | 62 | 13 | 41.06 | 20.97% | 3.16 | 0.69 | $7.93 | $6.8 | $1.13 | 14.24% |
| ▸ Australia | 3,667 | 627 | 605.03 | 17.1% | 0.96 | 0.82 | $27.49 | $19.97 | $7.52 | 27.35% |
| ▸ Bahamas | 3 | 0 | 0.0 | 0.0% | 0.0 | 0.0 | $0.0 | $0.0 | $0.0 | NaN% |
| ▸ Bangladesh | 1 | 0 | 0.0 | 0.0% | 0.0 | 0.0 | $0.0 | $0.0 | $0.0 | NaN% |
| ▸ Barbados | 36 | 14 | 74.2 | 38.89% | 5.3 | 1.22 | $11.19 | $9.71 | $1.48 | 13.24% |
| ▸ Belgium | 11 | 3 | 0.97 | 27.27% | 0.32 | 0.82 | $0.02 | $0.02 | $0.01 | 30.65% |
| ▸ Belize | 7 | 4 | 3.62 | 57.14% | 0.9 | 1.57 | $0.78 | $0.65 | $0.14 | 17.39% |
| ▸ Benin | 2,499 | 615 | 10.26 | 24.61% | 0.02 | 0.59 | $3.27 | $2.06 | $1.21 | 36.96% |
| ▸ Bermuda | 49 | 25 | 16.05 | 51.02% | 0.64 | 1.22 | $2.46 | $3.36 | $0.1 | 22.69% |
| ▸ BonaireSintEustat... | 81 | 21 | 49.07 | 25.93% | 2.34 | 0.77 | $5.27 | $4.41 | $0.85 | 16.18% |
| ▸ Brazil | 85 | 42 | 136.93 | 49.41% | 3.26 | 3.53 | $3.36 | $2.57 | $0.79 | 23.55% |
| ▸ BritishVirginIslands | 21 | 7 | 2.68 | 33.33% | 0.36 | 1.38 | $0.58 | $0.51 | $0.08 | 13.24% |

FIG. 4

CALL ROUTING AND REAL-TIME MONITORING

CROSS REFERENCE TO RELATED APPLICATION

This application is a continuation of U.S. patent application Ser. No. 14/185,569, filed Feb. 20, 2014, which claims the benefit of provisional patent application Ser. No. 61/766,845, filed on Feb. 20, 2013, the entire contents of which are incorporated herein by reference.

FIELD

The present invention relates generally to telecommunications, and particularly to a system and method for providing telephone call routing analytics for a telecommunications carrier.

SUMMARY

The present invention is directed to a method for providing call routing analytics comprising providing a virtual session initiation protocol switch that is hosted in an internet cloud-based environment, providing a processor programmed to extract call detail records for a subscriber for all calls that utilize the switch, automatically processing all of the subscriber's call records to monitor route performance for a subscriber, transmitting real-time route performance data to the subscriber for display at a subscriber computer, and altering a routing of at least a portion of the calls utilizing the switch in response to the real-time route performance data.

The invention is further directed to a system for providing call routing analytics, comprising a cloud hosted session initiated protocol switch, wherein the switch streams call detail records, a call detail record queue to temporarily hold the call detail records, a processor programmed to divide the call detail records into analytic constituents, transmit call detail records to a storage media, process the analytic constituents and transmitting real-time route performance data to a subscriber for display at a subscriber computer based on the analytic constituents; and a subscriber interface configured to receive the analytic constituents.

BRIEF DESCRIPTION OF THE DRAWINGS

FIG. 3 is an illustration of call routing analytics provided a subscriber showing detailed routing information on a per carrier basis.

FIG. 4 is an illustration of an Internet web page that utilizes the system and method of the present invention to provide a subscriber with certain call routing analytics.

DESCRIPTION

Figure 1:
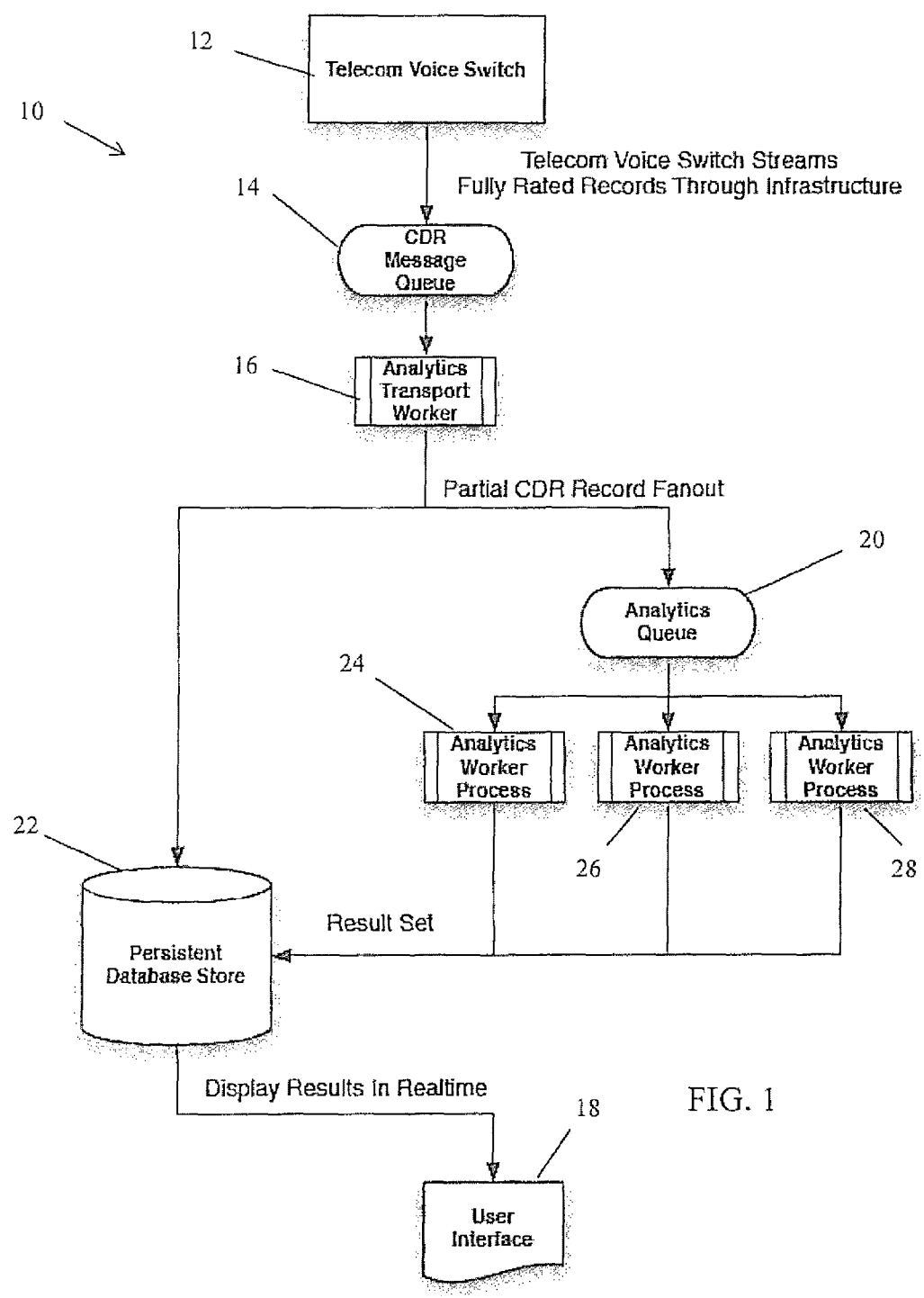
FIG. 1 is a diagrammatic representation of a system for providing call routing analytics to a subscriber.

In telecommunications networks, Session Initiation Protocol (SIP) is an application-layer signaling protocol used to create, modify, and terminate telephone calls having one or more users. These telephone calls include cell phone to cell phone, land line to land line, land line to cell phone, and Internet telephone calls. SIP has become a widely accepted IP signaling service in the telecommunications industry.

The main function of an SIP switch is to initiate and terminate interactive communications between users. The SIP switch performs several functions such as determining the location of users, monitoring call length, call attempts and completions, call minutes, the average success rate of calls from one carrier to another, and post dial delay. In operation a telephone information signal is transmitted from an origin device, telephone, through the origin user's carrier to the SIP switch. The SIP switch passes the telephone information signal to the destination user's carrier. When the destination user is located, the SIP switch transmits a response to the call invitation to the originating user. If the invitation is accepted the call is connected and becomes active. When the call is concluded, the SIP switch terminates the call connection. A call from an IP enabled device to a standard telephone set connected to the Public Switched Telephone Network (PSTN) is one type of call that can be placed through the SIP switch. The IP enabled device communicates with the PSTN via an IP network gateway. The network gateway is an interface that provides mediation from a packet switched IP signaling/voice system to the circuit switched, time division multiplexed (TDM) system employed by the PSTN.

The accurate and timely billing of calls passed across the SIP switch and determining the routing performance of calls are important factors to carriers for profitability and quality assurance. Each call that transverses the SIP switch includes call metadata that may be collected from the call to generate a call data or call detail record (CDR). Call data records include information such as an SIP code, an SIP reason, an origin caller ID, a time stamp, call start, answer, and end time, call duration, post dial delay time, the origin carrier name, an origin trunk name, the origin billing rate, and origin prefix. The metadata may also include the terminating carrier, the terminating: trunk name, the terminating carrier's billing rate and time billed, the jurisdiction of the call, the switch IP address, and several other characteristics of the call. This data is used to generate billing records for carriers to use in collecting fees for use of their services. This metadata can also provide the carrier with call routing analytics that are useful in determining the efficiency of the carrier's network and the efficiency and cost of networks the carrier is utilizing to connect calls.

In addition to telephone calls, SIP sessions may be used in video conferencing, streaming multimedia distribution, instant messaging, presence information, file transfer, fax over IP, online games, etc. The SIP protocol governs the establishment, termination and other elements of a call made over IP networks. Thus, SIP switches may create a bottleneck for messages sent between carriers that are used to connect calls.

Voice-over-IP (VoIP) carrier connectivity includes numerous session border controllers or SIP proxies that act as a gateway on the edge of a carrier network and mediate incoming and outgoing traffic from other carriers. Voice carriers are responsible for interconnecting phone networks worldwide so that phone networks on different platforms and with competing business frameworks can complete calls in a way that is seamless to the end-user. The SIP switch of the present invention provides a telecommunications exchange that mediates transactions and routes calls seamlessly to a less expensive and more efficient carrier. The SIP switch may setup and complete the calls anonymously between the carriers. Subscribers are able to conduct voice traffic termination over a distributed and shared architecture, without having any knowledge of any other subscriber to the system. To the subscriber, nothing is shared. To the operator of the fabric, everything is shared.

The key components of an SIP proxy are voice switching, routing (including jurisdictional determination), CDR generation and storage, and security. The switching features may relate to the ability of different pieces of hardware to exchange voice signaling cooperatively and to control the flow of traffic between carrier networks. The routing features may relate to how calls are handled once they are inside the switch and to which carriers a particular phone number is routed. The CDR serves as both a method to bill a telephone call, but also contain diagnostic and analytic related information that may be used to monitor the caller's performance. The security function of the switch may act as a gatekeeper and may permit only carriers who have specifically interconnected to pass traffic.

A traditional SIP proxy or switch handles the above described functions with a single piece of hardware (SIP Server) deployed in a fixed location with an independently maintained device. Because, a traditional SIP switch is a hardware component, it may become a bottleneck to efficient and effective operation of the network when network traffic exceeds the SIP hardware capacity.

The present invention provides a virtual SIP switch that segregates each of the routing components and the software infrastructure allowing for horizontal growth of switching capacity to alleviate the bottleneck discussed above. The switching, security, CDR storage and routing components of the cloud-based SIP switch of the present invention are each handled by clusters of purpose driven hardware and software suites allowing deployment of a sealable voice routing fabric spread over multiple geographic areas and shared by groups of subscribers. The SIP switch of the present invention provides for the scalability of virtual voice infrastructure and makes the voice fabric elastic. The infrastructure is self-healing and auto-expandable, where any cluster can sense the failure of a particular node and shift the resources to fill in the gap. Further, any cluster can expand the pool of available resources based upon a cluster demand and provide additional cloud infrastructure to handle the increased load. The clusters can be geographically diverse and location aware, where the origination or termination IP address endpoints of a call may be used to geographically choose the closest cluster to either end of the call. This lowers the overall latency, chance of packet loss, and round trip hops in a VoIP signaled call.

Turning now to the figures, FIG. 1 shows a diagrammatic representation of a system 10 for providing call routing analytics to a subscriber. The system comprises the cloud-based SIP switch 12 discussed above, a CDR queue 14, a processor 16, and a subscriber interface 18. The CDR queue comprises a read/write digital medium that receives CDR's streamed from the switch 12, temporarily stores the CDRs before passing them to the processor 16. The switch 12 streams a CDR for each call that crosses the switch. Thus, thousands of CDRs may be streaming to the queue per second. Because the queue 14 is cloud-based it may be expanded or contracted to suit the amount of CDR data streaming from the switch.

The system uses processor 16 to divide the call detail records into analytic constituents and transmits them to the analytics queue 20. The processor also copies each of the call detail records and routes them directly to a persistent database 22 for storage in accordance with applicable industry and regulatory standards. Separate modules 24, 26, and 28 process the analytic constituents and transmit real-time route performance data to a subscriber for display at a subscriber interface. The modules may be configured to determine profitability of the subscriber's traffic, number of calls, success rate of calls, vendor makeup, origin and destination of calls.

As used herein analytic components may comprise call characteristics from the call detail records that are used to determine a carrier's route performance. The processor may access data loaded into the system by a subscriber, such as call rate tables, to assist in determining route performance. As used herein, route performance may comprise quality of signaling and business performance. Real-time routing performance data may comprise real-time subscriber profitability and margin.

To determine subscriber profitability and margin the processor accesses the subscriber's preloaded rate tables and overhead allocation data. The processor determines the length of each call accessing the subscriber's network from the call detail record, the applicable rate and determines the amount it will bill for the call. The subscriber's overhead may include the cost of any origin or destination charges incurred in handling the call. Using this information the processor determines the profitability of each call. The processor determines the profitability of each call as it passes through the SIP switch and updates the profitability calculation provided to the subscriber in real-time. Thus, the subscriber has an interface, for example a web interface, which allows it to track route performance as calls are connected, disconnected or fail as they occur. As used herein real-time route performance data may comprise metrics such as length of calls, average length of calls, origin rates, destination rates, jurisdiction data, answer seizure ratio, origin, destination, and post dial delay. The real-time route performance data may also include successful and unsuccessful connections through a carrier and volume of calls to and from a carrier and or subscriber. With this information the subscriber may alter its performance parameters to reroute call traffic to a more efficient or effective route, depending on the subscriber's goal. This immediate access to real-time analytic data allows the subscriber to maintain profitability while monitoring the quality of signaling through the SIP switch. The virtual nature of the system of the current invention also permits for the reallocation of resources to immediately meet the growing or contracting needs of the subscriber by the switch provider without the need for additional hardware or capital expense by the subscriber.

The information is presented to the subscriber at the user interface in a manner that permits the subscriber to react to its route performance as it is occurring instead of using stale data from call detail records that are minutes or hours old.

Figure 2:
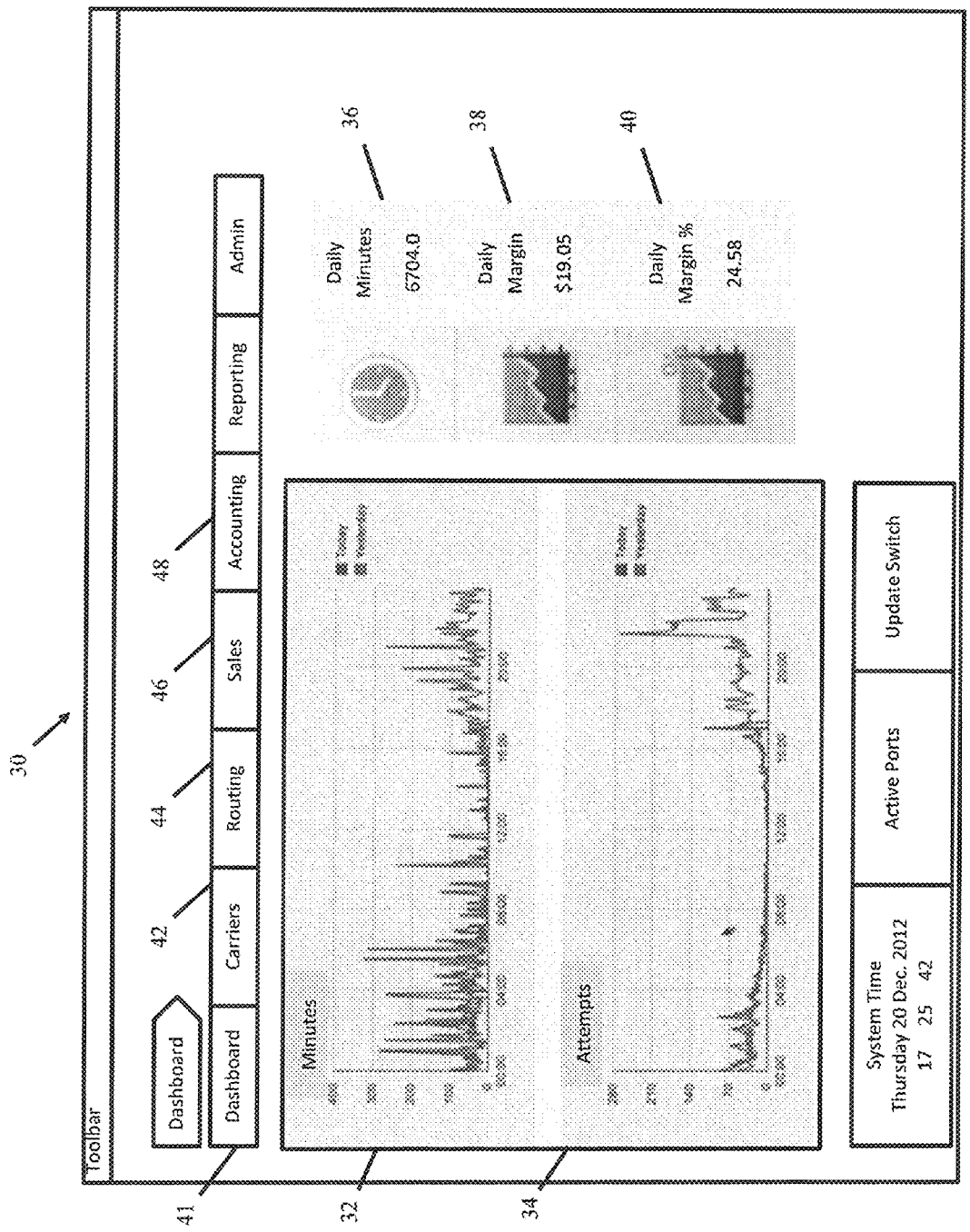
FIG. 2 is a diagrammatic representation of an Internet web page showing call routing analytics provided to a subscriber at a subscriber interface.

Turning now to FIG. 2, there is shown a representative webpage 30 to display the real-time rate performance of the subscriber's calls. The webpage comprises a plurality of features designed to assist subscribers in monitoring route performance. For example, the page of FIG. 2 shows the subscriber the call minutes 32 it has sold for a particular day versus a historical day, current and historical call attempts 34, the total minutes 36 used for the applicable day, the subscriber's real-time daily margin as dollars 38 and a percentage 40. The may also provide the subscriber with other data such as calls per second. The page also provides the subscriber the ability to see detailed information supporting the information displayed on the dashboard 41 such as carriers 42, routing 44, sales 46, and accounting 48 in real-time simply by clicking on the applicable button. The page also provides the subscriber a real-time gauge 50 showing the number of ports actively used by the subscriber. This feature is important to provide the subscriber the ability to monitor and see when the subscriber's traffic is reaching its maximum allocated capacity and proactively seek allocation of additional resources through the switch instead of reacting to call failure and poor network performance after the fact.

Turning now to FIG. 3, there is shown therein an exemplary web page at the user interface used to communicate information for a dialer and its interaction with five (5) carriers. The number of carriers could be expanded to include an infinite number of carriers. However, for the purpose of simplicity only five (5) carriers are shown. The analytic information provided the subscriber may include call attempts, completed calls, minutes used, answer success rate (ASR), average length of call (ALOC), post dial delay (PDD), revenue, cost, margin, and margin percentage. This information is culled in real-time from the streamed CDRs and constantly updated and provided to the subscriber interface. Thus, the subscriber is able to monitor the real-time route performance and adjust the routing of calls to more efficient, effective, or less expensive carriers. The present invention may be used to provide a least cost routing system without requiring the subscriber to use stale data and invest in expensive or unnecessary hardware.

With reference now to FIG. 4, there is shown a webpage showing traffic for a carrier based on country. The page shows total call traffic and call traffic by country. Again, this information is live real-time data culled from the CDRs streamed from the SIP switch. The data provided the subscriber is modifiable by the subscriber, but may include call attempts, complete calls, minutes sold, ASR, ALOC, PDD, revenue, cost, margin and margin percentage.

In operation the present invention provides a method for providing routing analytics in an SIP telecommunications network. A virtual session initiation protocol switch is provided. The switch is hosted in an Internet cloud-based environment and used to connect multiple carriers in a telecommunications environment. A processor programmed to extract call detail records for a subscriber for all calls that utilize the switch is provided and automatically processes all for the subscriber's call records to monitor route performance for a subscriber. The real-time route performance data is transmitted instantly to the subscriber from the processor for display at a subscriber computer. The subscriber then is able to alter the routing of at least a portion of the calls utilizing the switch in response to the real-time route performance data. A complete version of each call detail record is stored in a database for later access, if needed. The real-time route performance data may comprise, but is not limited to, the subscriber's quality of signaling or real-time profitability. Thus, the subscriber may alter the subscriber's rate table or routing of at least a portion of the calls to increase the subscriber's profitability. In accordance with the method of the invention, a predetermined set of analytic outputs may be selected. All of the subscriber's call records may be processed by the computer system having a processor to monitor route performance to automatically dividing the call detail records into a plurality of component data sets and processing the component data sets to generate a plurality of analytic outputs corresponding to the predetermined set of analytic outputs indicative of route performance.

Although the present invention has been described with respect to preferred embodiment, various changes and modifications may be suggested to one skilled in the art, and it is intended that the present invention encompass such changes and modifications as fall within the scope of this disclosure.

What is claimed is:

1. A method for providing call routing analytics, comprising:
    providing a processor programmed to extract a plurality of call detail records for a subscriber for all calls that utilize a switch;
    automatically processing the plurality of call detail records to monitor route performance for the subscriber;
    transmitting real-time route performance data, based on the plurality of call detail records, to the subscriber for display at a subscriber computer; and
    altering a routing of at least a portion of the calls, using the transmitted real-time route performance data, to alter real-time profitability of the subscriber.

2. The method of claim 1 further comprising displaying real-time route performance data at a subscriber display device.

3. The method of claim 2 further comprising hosting a secure website to display the real-time performance data and real-time profitability of the subscriber.

4. The method of claim 1 further comprising archiving the plurality of call detail records on a database.

5. The method of claim 1 wherein the real-time route performance data comprises quality of signaling.

6. The method of claim 1 further comprising altering a call rate table.

7. The method of claim 1 further comprising selecting a predetermined set of analytic outputs; wherein automatically processing the plurality of call detail records to monitor route performance comprises automatically dividing the plurality of call detail records into a plurality of component data sets and processing the component data sets to generate a plurality of analytic outputs corresponding to the predetermined set of analytic outputs indicative of route performance.

8. The method of claim 1 in which the switch comprises a virtual session initiation protocol switch.

9. The method of claim 8 wherein the virtual session initiation protocol switch is hosted in an Internet cloud-based environment.

10. A system comprising:
    a session initiated protocol switch configured to stream call detail records;
    a processor programmed to receive and divide the call detail records into analytic constituents, process the analytic constituents and transmit real-time routing performance data to a subscriber for display at a subscriber computer based on the analytic constituents; and
    a subscriber interface displayed at the subscriber computer and configured to communicate real-time subscriber profitability and real-time call traffic.

11. The system of claim 10 further comprising a digital medium to receive the call data records from the switch and to transmit the call data records to the processor.

12. The system of claim 11 wherein the digital medium comprises a scalable cloud-based call data record storage queue.

13. The system of claim 10 further comprising a call detail record storage medium to store the call detail records in a database for later access.

14. The system of claim 10 wherein the real-time routing performance data comprises length of calls, origin rates, destination rates, jurisdiction data, answer seizure ratio, origin, destination, and post dial delay.

15. The system of claim 10 wherein the real-time routing performance data comprises quality of signaling.

16. The system of claim 10 further comprising a subscriber interface to display the real-time routing performance data.

17. The system of claim 16 wherein the subscriber interface comprises a secure website.

18. The system of claim 10 wherein the real-time routing performance data comprises a business performance parameter of the subscriber.

19. A method for providing call routing analytics, comprising:
providing a processor programmed to extract a plurality of call detail records for a subscriber for all calls that utilize a switch;
automatically processing the plurality of call detail records to monitor route performance for the subscriber;
transmitting real-time route performance data, based on the plurality of call detail records, to the subscriber for display at a subscriber computer; and
altering a call rate table.

20. The method of claim 19 further comprising selecting a predetermined set of analytic outputs; wherein automatically processing the plurality of call detail records to monitor route performance comprises automatically dividing the plurality of call detail records into a plurality of component data sets and processing the component data sets to generate a plurality of analytic outputs corresponding to the predetermined set of analytic outputs indicative of route performance.

21. The method of claim 19 further comprising altering the routing of at least a portion of the calls in real-time to increase profitability of the subscriber.

\* \* \* \* \*